United States Patent [19]

Van Wicklin, Jr.

[11] 4,280,372
[45] Jul. 28, 1981

[54] STEERING WHEEL ASSEMBLY

[75] Inventor: Warren A. Van Wicklin, Jr., Dearborn, Mich.

[73] Assignee: Ford Motor Company, Dearborn, Mich.

[21] Appl. No.: 57,940

[22] Filed: Jul. 16, 1979

[51] Int. Cl.³ .............................................. B62D 1/04
[52] U.S. Cl. .................................................... 74/552
[58] Field of Search .................. 74/552, 558, 484, 492

[56] References Cited

U.S. PATENT DOCUMENTS

| 3,016,764 | 1/1962 | Fredericks et al. | 74/552 |
| 3,167,974 | 2/1965 | Wilfert | 74/552 |
| 3,483,770 | 12/1969 | Eibl et al. | 74/552 |
| 3,528,314 | 9/1970 | Barenyi | 74/552 |
| 3,561,286 | 2/1971 | Edge et al. | 74/552 |
| 3,563,112 | 2/1971 | Wilfert | 74/552 |
| 3,583,255 | 6/1971 | Curcuru | 74/552 |
| 3,641,834 | 2/1972 | Barenyi | 74/552 X |
| 3,802,291 | 4/1974 | Young, Jr. et al. | 74/552 |
| 3,934,897 | 1/1976 | Moos | 74/492 X |

Primary Examiner—C. J. Husar
Assistant Examiner—Moshe I. Cohen
Attorney, Agent, or Firm—John J. Roethel; Clifford L. Sadler

[57] ABSTRACT

A steering wheel assembly having an energy absorbing sleeve 13 supported on a hub 12 and a steering wheel 14 supported on the sleeve. The energy absorbing sleeve has a plurality of concentric, substantially rectangular rings 19 formed in stepped relationship to provide essentially crush force throughout its range of usable crush.

The steering wheel 14 comprises an armature 15 forming a housing 22 for the energy absorbing sleeve, the upper end of the housing being complementary to the rectangular configuration of the sleeve. The armature further has an annular rim core 24 and a plurality of spokes 25 extending from the housing to the rim core. The housing 22, the spokes 25 and the rim core 24 are integrally molded of plastic, preferably a polycarbonate selected for its impact strength over a wide temperature range.

9 Claims, 9 Drawing Figures

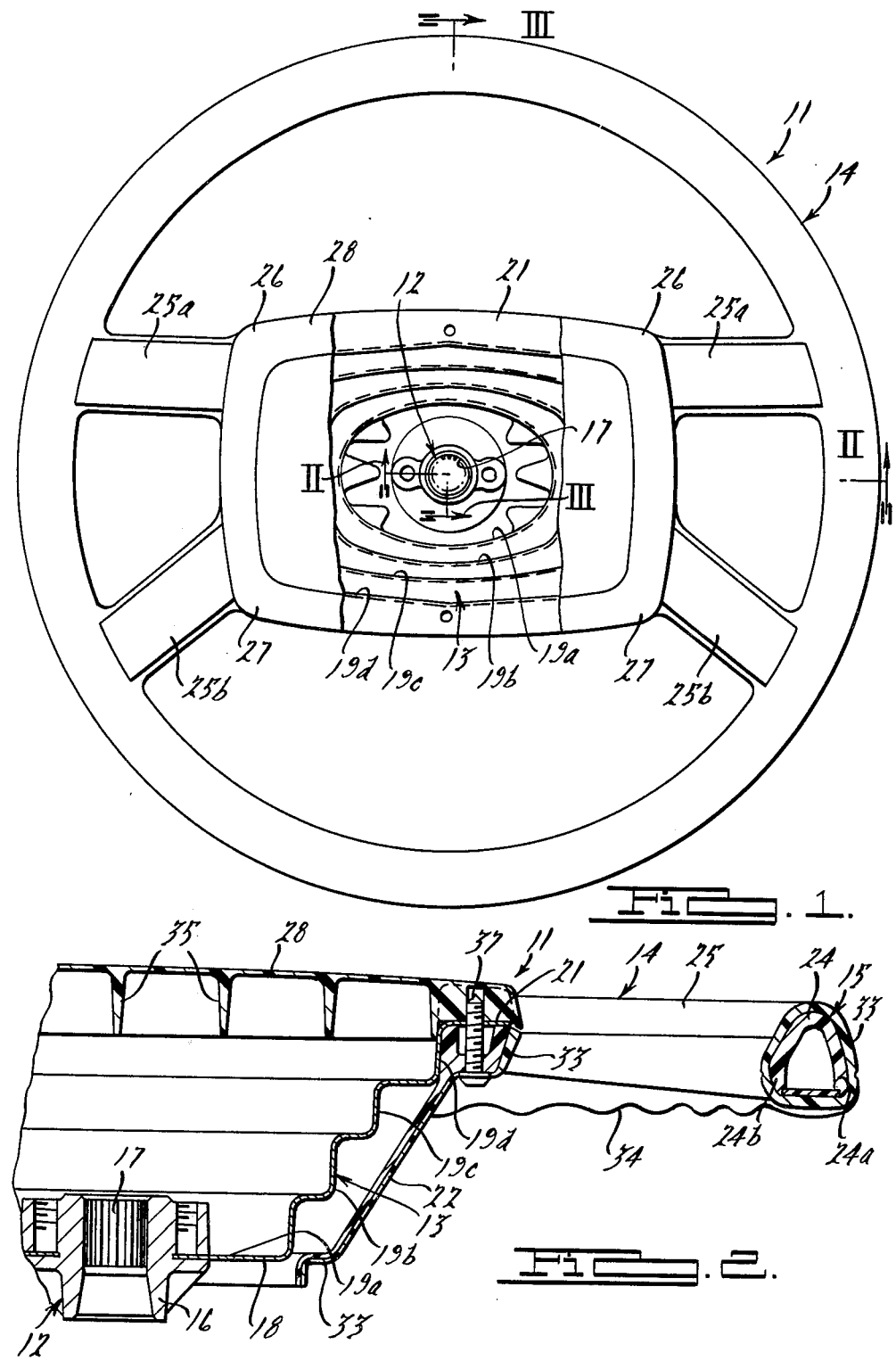

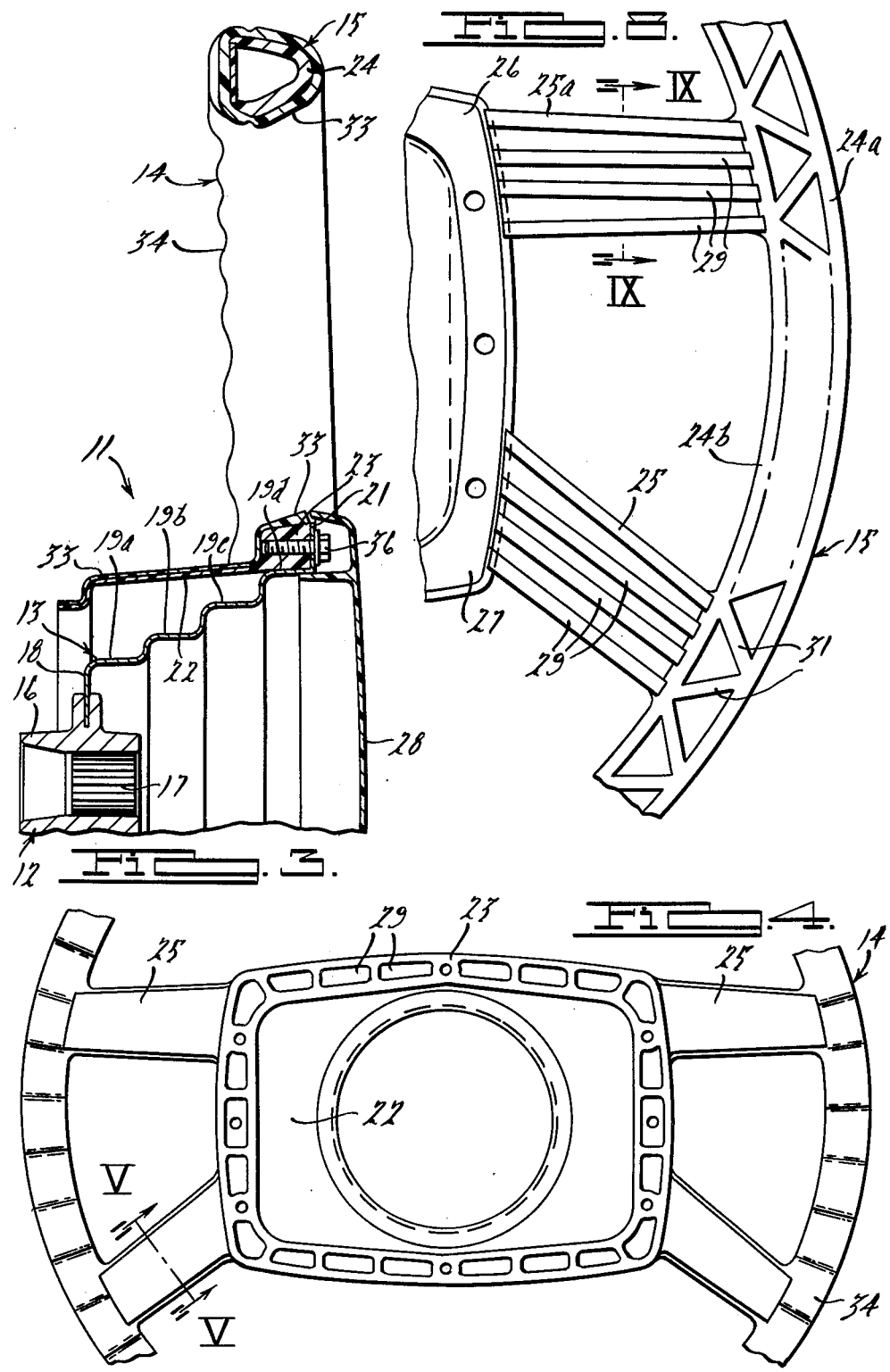

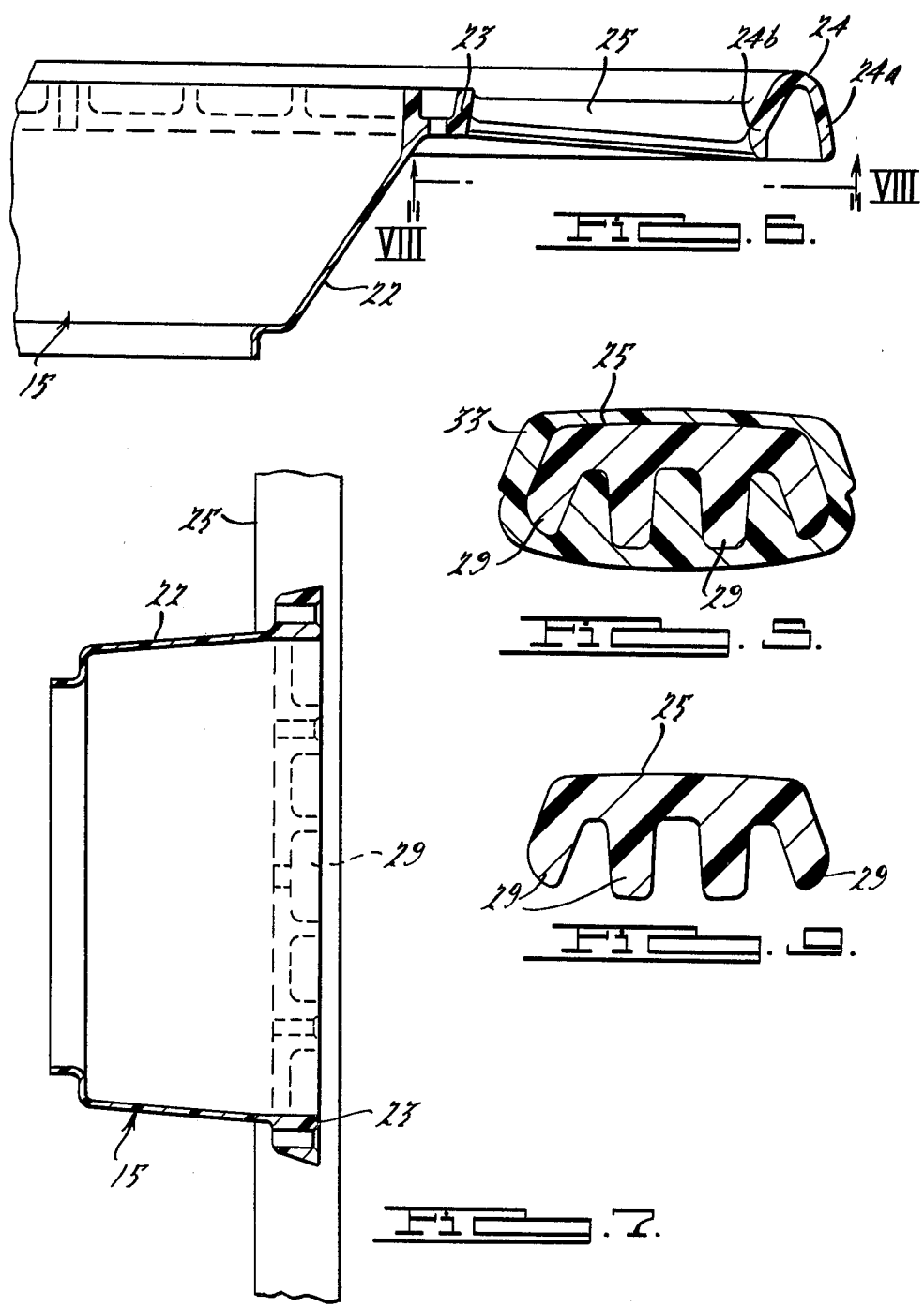

STEERING WHEEL ASSEMBLY

BACKGROUND OF THE INVENTION

The present invention relates to steering wheels for motor vehicles, and more particularly, to impact energy absorbing steering wheels.

U.S. Pat. No. 3,016,764 issued Jan. 16, 1962 to R. H. Fredericks et al for a "Safety Steering Wheel" discloses a two-stage collapsible steering wheel comprising a flexible rim steering wheel having a steel armature that provides the necessary torsional stiffness for steering the vehicle while permitting axial displacement of the rim under relatively low impact load conditions. The armature is supported on a central energy absorbing structure constructed and arranged to progressively collapse under load to absorb any impact energy over and above that causing axial displacement of the rim. The present invention is an improvement upon the steering wheel of the Fredericks et al patent.

Other prior art of interest include U.S. Pat. Nos. 3,167,974 issued to K. Wilfert on Feb. 2, 1965 for a "Steering Wheel" and 3,802,291 issued to Young, Jr. et al on Apr. 9, 1974 for a "Soft Steering Wheel Rim."

SUMMARY OF THE INVENTION

In the preferred embodiment of the present invention, the steering wheel assembly has a hub, an energy absorbing sleeve supported on the hub, and a steering wheel supported on the sleeve.

The energy absorbing sleeve has a plurality of steps providing a plurality of concentric, substantially rectangular rings of increasing peripheral length extending axially from its hub end toward its armature supporting end. The steps are proportioned to provide essentially constant crush force throughout the range of usable crush of the sleeve.

The steering wheel comprises an armature having a thin wall central portion forming a housing for the energy absorbing sleeve. The upper end of the housing comprises a rectangular annulus complementary to the rectangular configuration of the energy absorbing sleeve. The armature further has an annular rim core and a plurality of spokes extending from the central portion to the rim core. The central portion, the spokes and the rim core are integrally molded of plastic, preferably a polycarbonate selected for its impact strength over a wide temperature range. The polycarbonate armature is covered with softer vinyl material.

DESCRIPTION OF THE DRAWINGS

The objects, advantages and features of the present invention will become more apparent as the description proceeds, reference being had to the accompanying drawings, wherein:

FIG. 1 is a plan view of a steering wheel assembly incorporating the principles of the present invention;

FIG. 2 is an enlarged sectional view taken substantially on the line 2—2 of FIG. 1;

FIG. 3 is an enlarged sectional view taken substantially on the line 3—3 of FIG. 1;

FIG. 4 is a fragmentary bottom view of the steering wheel assembly;

FIG. 5 is a section view taken substantially on the line 5—5 of FIG. 4;

FIG. 6 is a section view in part similar to FIG. 2 of only the steering wheel armature;

FIG. 7 is a section view in part similar to FIG. 3 of only the steering wheel armature;

FIG. 8 is a view looking in the direction of the arrows 8—8 of FIG. 6; and

FIG. 9 is a section view taken substantially on the line 9—9 of FIG. 8 looking in the direction of the arrows.

DETAILED DESCRIPTION OF THE INVENTION

Referring now to the drawings, and particularly to FIGS. 1, 2 and 3, there is shown a steering wheel assembly, generally designated 11, embodying the present invention. The steering wheel assembly 11 comprises basically a hub 12, an energy absorbing sleeve 13 supported on the hub 12, and a steering wheel 14 having its armature 15 supported on the sleeve 13.

The hub 12 is preferably a die-cast aluminum cylinder 16 having a splined aperture 17 adapted to be received on the splined upper end of a vehicle steering shaft (not shown). The hub 12 is cast in place on the lower base plate 18 of a steel energy absorbing sleeve 13. The sleeve 13 has a plurality of steps 19, individually identified as 19a, 19b, 19c and 19d, providing a plurality of concentric, substantially rectangular rings of increasing peripheral length extending from its base plate 18 end toward its armature 15 supporting end. The steps 19 are proportioned to provide essentially constant crush force throughout the range of usable crush of the sleeve. When crushed, the energy absorbing sleeve 13 forms concentric nested rings, the sleeve 13 being crushable to the height of approximately one step before high-rate buildup is encountered.

The stepped steel sleeve 13 embodied in the present invention provides the structural stability required to support the armature 15. The wide, short proportions of the stepped sleeve allows efficient energy absorption during collapse, not only when the collapse is the result of pure axial loading, but also when the direction of the applied load is eccentric or oblique. The stepped sleeve 13, as compared, for example, to a tapered convoluted sleeve, has the further benefit of greater energy absorption efficiency and improved crush ratio. Energy absorption efficiency can be defined as the energy absorbed by the structure for a given amount of deflection or crush distance divided by the product of the maximum force developed in the crushing multiplied by the said crush distance. The steps 19a, 19b, 19c and 19d of the stepped sleeve 13 are provided with such proportions to the several steps so as to provide essentially constant crush force throughout the range of usable crush. This result is obtained by increasing the lateral width of each step as the peripheral length of each step increases from the smallest, bottom step 19a to the largest, topmost step 19d, the unit length of the narrow steps being stiffer than for the wider steps thereby compensating for the much greater periphery of the wide upper step compared to the narrow lower step.

Another benefit derived from the disclosed stepped sleeve 13 is its crush ratio. The stepped sleeve 13 forms concentric nested rings when crushed. This type of sleeve can be crushed to a height of approximately one step before high rate buildup is encountered. With a four-step sleeve as disclosed, this means that a crush ratio of about 25% is possible—which again represents a significant gain in comparison to a tapered convoluted sleeve.

The energy absorbing sleeve 13, when observed in the plan view, has at its top end a substantially rectangular configuration as outlined by a flange 21.

The armature 15 has a substantially frusto-conical thin wall central portion forming a housing 22 for the energy absorbing sleeve 13. The upper end of the housing comprises a rectangular annulus 23 the rectangular opening of which is complementary to the rectangular configuration of the upper step 19d of the energy absorbing sleeve 13. The armature also includes an annular rim core 24 and a plurality of spokes 25 extending from the annulus 23 of the housing 22 to the rim core 24, see FIGS. 6 and 8.

The steering wheel armature 15 preferably has four spokes 25 which, in the normal centered position of the steering wheel as shown in FIG. 1, have a configuration in which the upper two spokes 25a extend outwardly to the rim core 24 in alignment with each other from the upper corner portions 26 of the short sides of the rectangular annulus 23. The lower two spokes 25b extend from the lower corner portions 27 of the annulus 23 in an angularly downwardly direction. The particular arrangement of spokes on each side of the steering wheel provides substantial increase in rim stiffness while allowing the use of thin spokes that permit low deflection rates in bending out of the plane of the unstressed steering wheel. A low deflection rate of the spokes is desirable to protect the vehicle operator in the event of a frontal collision involving the vehicle. That is, when the anterior surface of the driver's abdominal region strikes the steering wheel rim, the spokes allow the rim to deflect without excessive reaction force until the thoracic region contacts the large surface area of a hub cover 28. The force applied to the hub cover 28, if sufficiently great, will be transmitted to and cause collapse of the energy absorbing sleeve 13.

As best seen in FIGS. 8 and 9, the spokes 25 are formed on their underside with a plurality of ribs 29. The rim core 24 is U-shaped in cross-section with the legs 24a and 24b being reinforced by a plurality of staggered or alternately angularly extending ribs 31. The annulus 23 around its perimeter also is provided with a plurality of downwardly extending recesses 32. All of the voids created by the various rib patterns and the like are for the purpose of reducing the weight of the armature 15 without any reduction in its strength. The total configuration of the armature 15 is such that it may readily be molded in one piece of a polycarbonate plastic having a desired impact strength over a wide temperature range. It has been possible to mold polycarbonate armatures that are 45% lighter than typical rigid steel armatures.

To complete the steering wheel 14, the armature is covered on its external surfaces, particularly over the outer surface of the housing 22, around the spokes 25 and around the rim core 24, with a softer vinyl covering layer 33. The vinyl layer over the rim core 24 may be formed on the underside with conventional finger grip grooves 34.

The hub cover 28 is molded in a substantially rectangular configuration from a suitable plastic such as a color impregnated acrylonitrile-butadiene-styrene copolymer. The cover 28 is hollow having suitable cross ribs 35 to provide the necessary rigidity while minimizing the weight.

The energy absorbing stepped sleeve 13 and the armature 15 are secured to each other by thread-forming or self-tapping screws 36. In the event that all the screw fasteners 36 fail in tension, the vehicle could still be steered since the plastic armature is trapped between the energy absorbing stepped sleeve and the upper rearward end of the steering column (not shown) to which the hub 12 is coupled. The steering wheel, in this hypothetical situation, cannot be pushed forward more than perhaps 3 or 4 mm before the rear face of the steering column where the latter projects through the hub prevents further forward steering wheel movement; it cannot be pulled back toward the driver because of the flange around the energy absorbing sleeve; it can, however, transmit steering torque to the steering gear because said torque can be effectively carried through the rectangular fit between the plastic armature and the energy absorbing steel sleeve.

The cover plate 28 is held in place by suitable self-tapping screws 37 around its perimeter.

It is to be understood this invention is not limited to the exact construction illustrated and described above, but that various changes and modifications may be made without departing from the spirit and scope of the invention as defined in the appended claims.

I claim:

1. A steering wheel assembly having a hub, an energy absorbing sleeve supported on the hub, and a steering wheel armature supported on the sleeve, wherein the improvement comprises:

the energy absorbing sleeve when observed in the plan view having at its top end a substantially rectangular configuration, the aramture having a thin wall central portion forming a housing for the energy absorbing sleeve, the upper end of the housing comprising a substantially rectangular annulus the opening of which is complementary to the rectangular configuration of the energy absorbing sleeve, an annular rim core, and a plurality of spokes extending from the armature central portion to the rim core, the armature central portion, the spokes and the rim core being integrally molded of plastics, and fastening means securing the energy absorbing sleeve and the armature to each other at the upper end of the sleeve, the energy absorbing sleeve having a peripheral rectangular flange overlying the rectangular annulus of the armature at the upper end of the housing to inhibit displacement of the armature axially upward from the energy absorbing sleeve in the event of failure of the fastening means.

2. A steering wheel assembly according to claim 1, in which:

cover plate conceals the energy absorbing sleeve and the rectangular annulus of the armature therebeneath.

3. A steering wheel assembly according to claim 1, in which:

the fastening means comprising thread forming screws extending in tension from the housing annulus through the peripheral flange of the energy absorbing sleeve into the cover plate.

4. A steering wheel assembly according to claim 1, in which:

the rectangular opening in the armature housing annulus has a sufficiently close engagement with the complementary rectangular upper end of the energy absorbing sleeve to transmit steering torque from the rim core to the steering shaft with only a slight amount of lash in event of failure of the fastening means.

5. A steering wheel assembly according to claim 4, in which:
   at least four spokes join the rim core to the central portion of the armature,
   the spokes are of relatively thin cross-section permitting low deflection rates in bending out of the plane of the unstressed steering wheel.

6. A steering wheel assembly according to claim 4, in which:
   the energy absorbing sleeve forms concentric nested rings when crushed,
   the sleeve being crushable to the height of approximately one step before high rate buildup is encountered.

7. A steering wheel assembly according to claim 4, in which:
   the energy absorbing sleeve has a plurality of steps providing a plurality of concentric, substantially rectangular rings of increasing peripheral length extending axially from its hub end toward its armature supporting end,
   the steps being proportioned to provide essentially constant crush force throughout its range of usable crush.

8. A steering wheel assembly according to claim 7, in which:
   the lateral width of each step is increasingly proportional to the increasingly peripheral length of each step from the smallest bottom step to the largest topmost step.

9. A steering wheel assembly according to claim 8, in which:
   the stiffness of the narrow steps per unit of peripheral length being greater for the narrow steps than for the wider steps, thereby compensating for the greater periphery of the wide upper steps compared to the narrow lower step.

* * * * *